United States Patent [19]
Tiffen et al.

[11] Patent Number: 5,105,312
[45] Date of Patent: Apr. 14, 1992

[54] LENS MOUNT ACCESSORY SYSTEM

[75] Inventors: Ira Tiffen, Mt. Sinai; Eric Seger, Wantaugh, both of N.Y.

[73] Assignee: Tiffen Mfg. Corp., Hauppauge, N.Y.

[21] Appl. No.: 684,648

[22] Filed: Apr. 12, 1991

[51] Int. Cl.$^5$ .............................. G02B 7/00; G02B 7/02
[52] U.S. Cl. ..................... 359/892; 359/819;
359/813; 359/611; 359/889; 354/295
[58] Field of Search ............... 359/819, 889, 892, 894,
359/885, 813, 611; 354/295

[56] References Cited

U.S. PATENT DOCUMENTS

| | | | |
|---|---|---|---|
| 3,377,427 | 4/1968 | Fischer | 359/889 |
| 3,656,841 | 4/1972 | Heinonen, Jr. | 359/889 |
| 4,032,939 | 6/1977 | Elton | 359/813 |
| 4,563,063 | 1/1986 | Coquin | 359/892 |
| 4,572,614 | 2/1986 | Lisfeld et al. | 359/889 |
| 4,746,955 | 5/1988 | Slayton et al. | 359/889 |

*Primary Examiner*—Loha Ben
*Attorney, Agent, or Firm*—Kirschstein, Ottinger, Israel & Schiffmiller

[57] ABSTRACT

A positioning wheel resiliently engages and moves an optical element to a selected position within a channel of a holder mounted in front of a camera lens. A brake mechanism prevents the optical element from accidentally falling out of the channel. A handle-operated camming mechanism provides for a quick lock/unlock interlock of a rotary holder in a desired angular orientation.

18 Claims, 4 Drawing Sheets

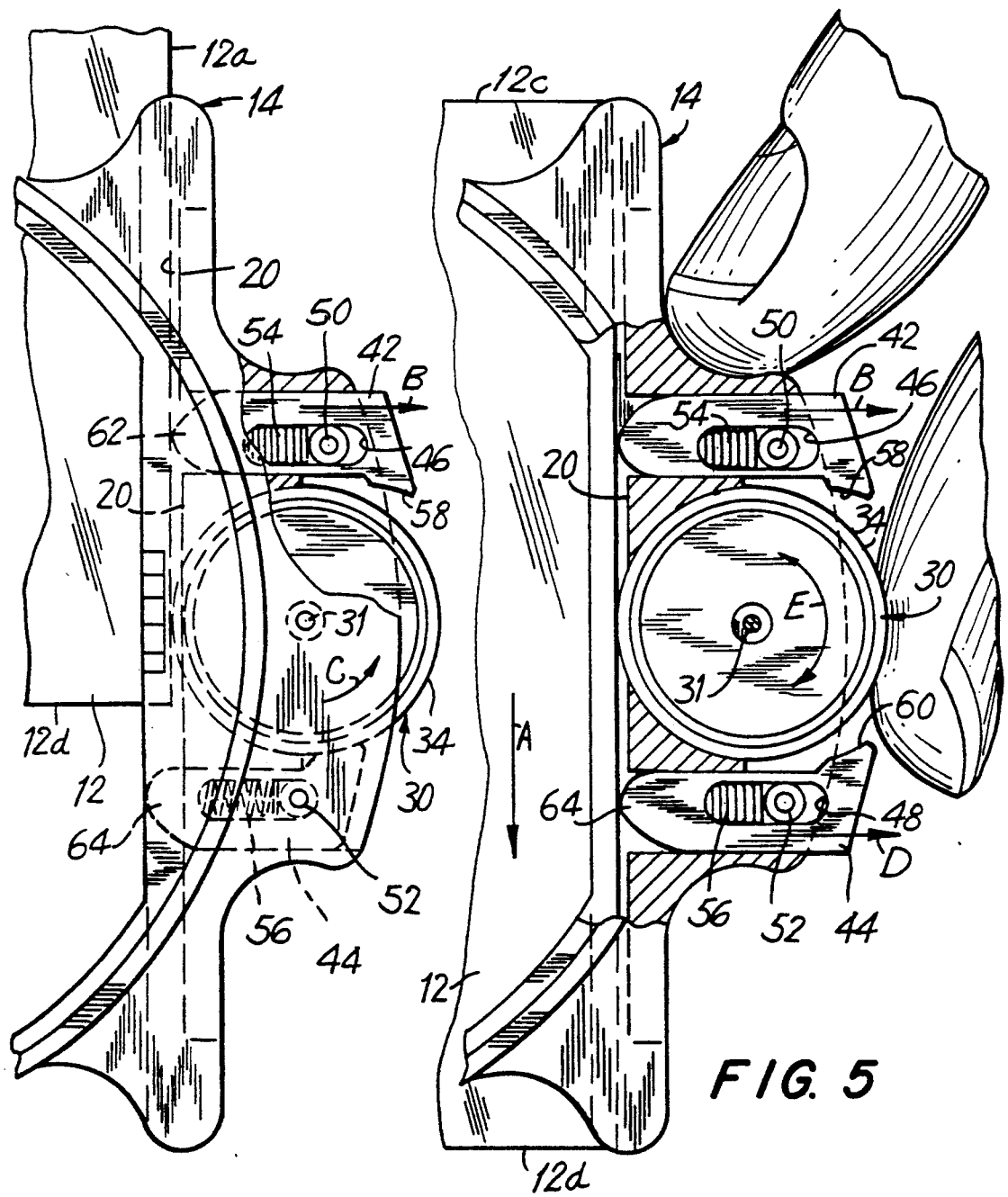

LENS MOUNT ACCESSORY SYSTEM

BACKGROUND OF THE INVENTION

1. Field of the Invention

This invention generally relates to a system for, and a method of, holding optical accessories, e.g. filters, polarizers and the like, in front of a lens such as a camera lens.

2. Description of Related Art

It is known to mount matte boxes, filter holder assemblies and analogous accessory holders in front of a camera lens to achieve a desired cinematographic effect. Reference can be had, for example, to the following U.S. Pat. Nos.: 4,381,885; 4,443,061; 4,563,063; 4,901,098; 4,487,312 and 4,063,266.

As described in at least some of these patents, the accessory holder is provided with a channel in front of the camera lens, and the accessory, usually a filter, is inserted into the channel. A "bare" filter itself may be grasped at its outer edges and positioned directly in the channel. However, to avoid direct grasping and touching of the bare filter itself, the filter is often placed within a frame, and the "framed" filter may be grasped, typically by a protruding handle, and positioned directly in the channel.

Although generally satisfactory for their intended purpose, the known accessory holders have not proven to be altogether desirable in practice. It is inconvenient and difficult to precisely position a bare or framed filter in a desired position within the channel. The push/pull force required to overcome friction between the filter and the channel is not uniform, nor easily controlled with any high degree of precision.

It is further known to mount a filter in a frame that has a rack along one edge. A mating pinion gear is then rotated to re-position the filter. However, the requirement for a racked frame and pinion gear adds to the overall weight, bulk and manufacturing cost.

Another problem with known accessory holders is that the filters may accidentally fall out of the channel, especially when the holders are rotated about 180°. Typically, set screws are used to lock the accessory in place within the channel. However, the leading edges of the set screws mar the accessories themselves. Also, failure to adjust the set screws can result in the accessory falling from the holder. When the accessory is a glass filter, it is prone to breakage upon striking the ground.

Still another problem with known accessory holders is the lack of a convenient means for rotating a holder to a desired angular orientation, and then locking the holder in that orientation. It is known to advance a set screw mounted in a rotary holder for the purpose of locking the holder in place. However, the known construction is disadvantageous, principally because the set screw tends to scratch and unduly wear the surface against which it bears. Also, the set screw requires many turns to advance it to a locking position and does not provide the user with an adequate tactile or visual indication of its locking position.

SUMMARY OF THE INVENTION

1. Objects of the Invention

It is a general object of this invention to advance the state of the art of lens mount accessory systems.

It is another object of this invention to finely and accurately position an optical element in a channel in a holder by turning a positioning wheel which resiliently engages and moves the optical element to a selected position within the channel.

Another object of this invention is to prevent the optical element from accidentally falling out of the channel.

A further object of this invention is to readily re-position and lock a holder in a desired angular orientation.

2. Features of the Invention

In keeping with these objects, and others which will become apparent hereinafter, one feature of this invention resides, briefly stated, in a lens mount system for, and a method of, mounting optical elements in front of a lens having an optical axis, which comprises a holder having a slide channel lying in a plane generally normal to the optical axis. The slide channel has opposite open ends. An optical element is slidably insertable into the slide channel through one of the open ends thereof along an insertion direction.

In accordance with one feature of this invention, adjustment means are provided for variably positioning the optical element to a selected position in the slide channel. The adjustment means includes a positioning wheel mounted for turning movement on the holder. The positioning wheel resiliently engages and moves the optical element to the selected position during such turning. The resilient engagement between the wheel and the optical element enables a uniform adjustment force to be applied with a high degree of precision.

Another feature of this invention is embodied in brake means on the holder for preventing the optical element from accidentally falling out of the channel past either open end thereof. The brake means advantageously includes first and second brakes flanking the positioning wheel, each brake being movable by the optical element from a braked position in which a respective brake lockingly engages a respective side of the positioning wheel, and an unlocked position in which the respective brake is disengaged from the positioning wheel. Release means are advantageously provided on the holder for releasing the brake means to enable the optical element to be removed completely from the channel when desired.

Still another feature of this invention relates to a hand-operated camming mechanism on one of a plurality of holders, and operative for cammingly interconnecting adjacent holders together. The mechanism allows for a quick lock/unlock action.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is an enlarged, partly broken-away, front view of FIG. 1 after partial insertion of the optical element;

FIG. 5 is a view analogous to FIG. 4 after full insertion of the optical element;

DETAILED DESCRIPTION OF THE PREFERRED EMBODIMENT

Figure 1:
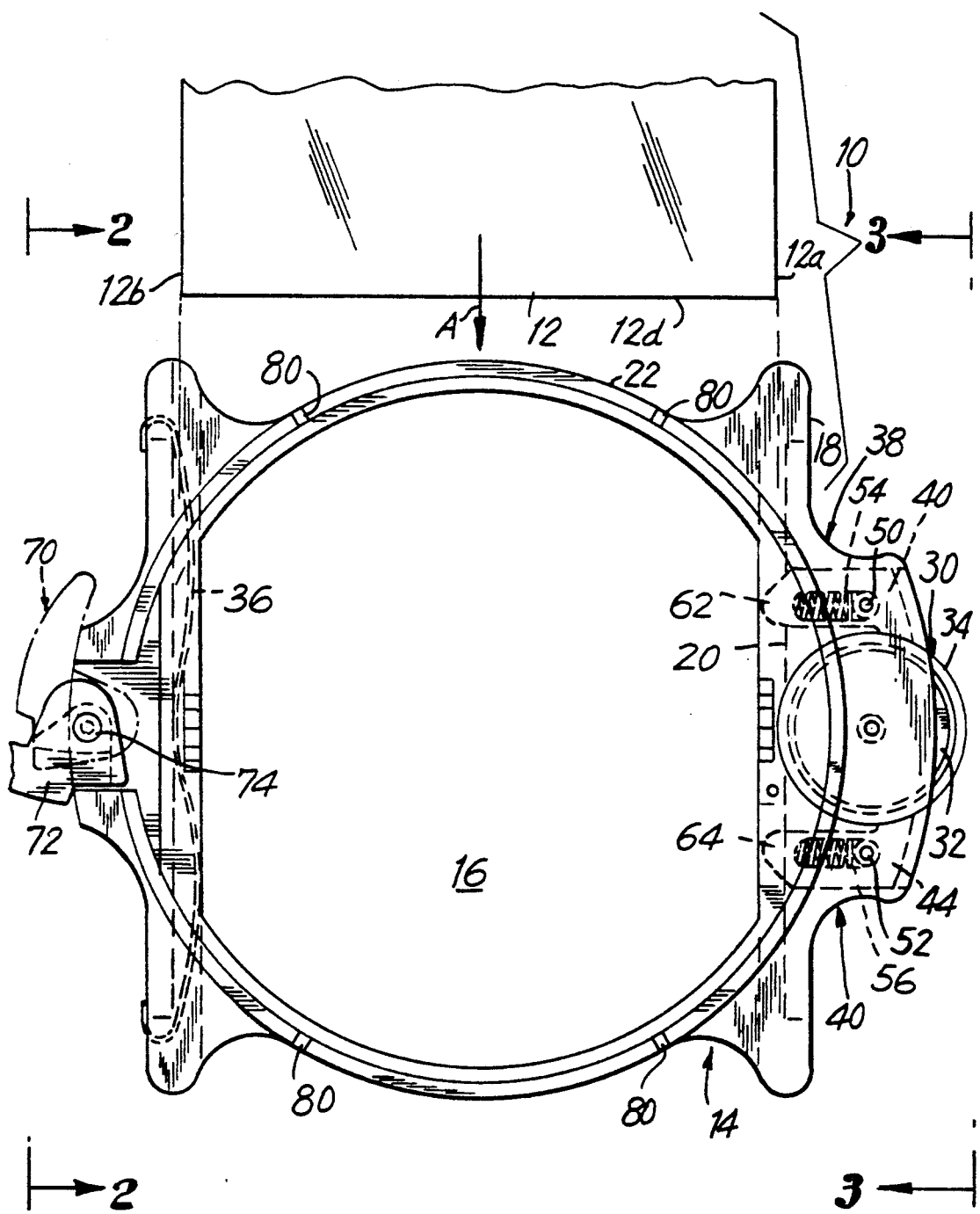
FIG. 1 is a front view looking directly into the optical axis of a camera lens of a lens mount system according to this invention prior to insertion of an optical element.

Referring now to the drawings, reference numeral 10 generally identifies a lens mount system for mounting an optical element 12 in a holder 14 positioned in front of a lens 16. The lens 16 is preferably a camera lens, but may be the lens of another type of optical device, e.g. binoculars. The optical element 12 is preferably a rectangular or square bare filter, but may be a framed filter, a polarizer, a cover, a sunshade or analogous accessory. The particular mounting of the holder on the camera forms no part of this invention and, hence, has not been described. Reference can be had to the above-identified patents for details of mounting structures that mount accessory holders in front of a camera lens.

Figure 2:
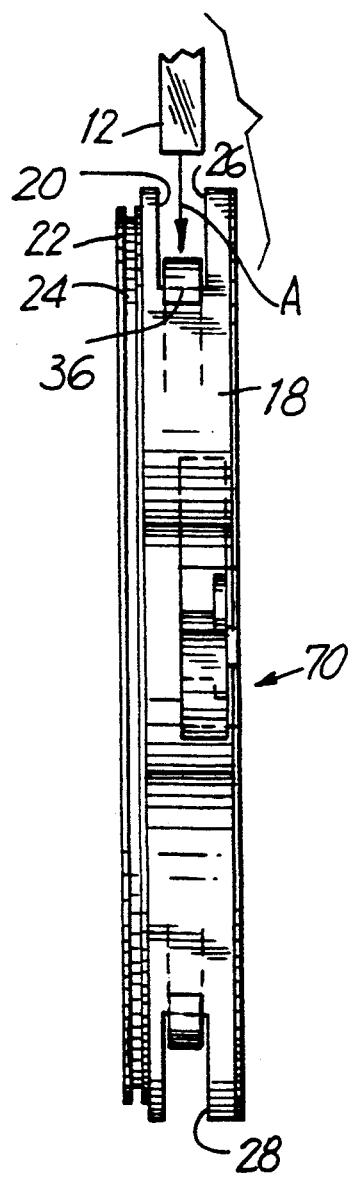
FIG. 2 is a side elevational view taken on line 2—2 of FIG. 1.
Figure 3:
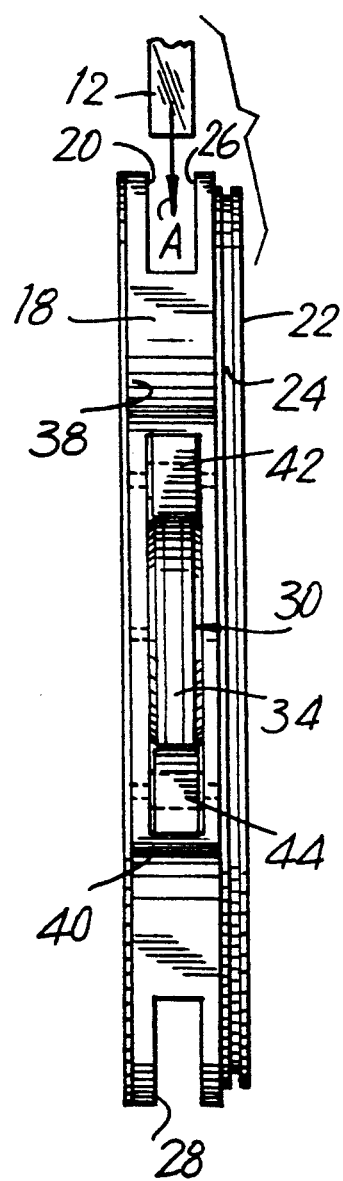
FIG. 3 is an opposite side elevational view taken on line 3—3 of FIG. 1.

As best shown in FIGS. 2 and 3, the holder 14 has a body portion 18 formed with an interior slide channel 20, as well as a connecting portion 22 formed with an annular groove 24. The body and connecting portions have opposite open axial sides. The channel 20 has opposite open ends 26, 28. As illustrated throughout the drawings, the channel 20 is oriented vertically, with the open end 26 being elevated above the open end 28. However, it will be appreciated by those skilled in the art that the holder 14 may be, and typically is, mounted for turning movement on the camera and, hence, the open end 26 may not be above the end 28 and, for example, maybe on the same level or below the end 28.

The channel 20 lies in a plane generally perpendicular to the optical axis of the lens 16. The element 12 is slid into the channel 20 through one of the open ends, e.g. upper end 26, along an insertion direction depicted by the arrow A. The element 12 could, of course, be inserted into the channel through the lower end 28.

A positioning wheel 30 is mounted for turning movement about turning axis 31 on the body portion 18. The wheel 30 has a resilient outer contact face for resiliently engaging and moving the element 12 to a selected position in the channel as described in detail below. The wheel 30 may be entirely constituted of a resilient material such as rubber, or, as illustrated, may have a rigid hub 32 over which a resilient ring 34, e.g. an O-ring, is mounted. The wheel 30 extends slightly inwardly into the channel 20 in order to firmly engage a side edge 12a of the element 12. The ring 34 is slightly compressed in the region where it contacts the side edge 12a. In the case where the element is a glass plate, the resilient ring 34 will cause no damage or excessive wear thereto. The wheel 30 also extends outwardly of the holder to allow a user to have manual access to, and to manually turn, the wheel and, in turn, to move the element 12 to the selected position within the channel.

A biasing means, advantageously embodied by a leaf spring 36, is mounted at and along the other side of the channel away from the wheel 30. The spring 36 engages an opposite side edge 12b of the element 12, and presses the element 12 firmly against the wheel. The spring 36 compensates for small differences in widths of different elements 12 while providing consistent pressure against the wheel. As described below, the spring 36 may also be used in connection with removing the element 12 completely from the channel.

A pair of finger rests 38, 40 flank opposite sides of the wheel, and allow either right- or left-handed users to place one or more fingers on the rests while another finger turns the wheel 30 (see FIG. 5).

When the wheel is turned to continue the movement of the element 12 down through the channel toward the end 28, the element 12 will eventually clear the wheel and fall out of the channel. Since there is no tactile or visual warning to announce the imminent clearing of the wheel by the element, a braking assembly is provided on the holder to prevent the element from accidentally falling out of the channel.

The braking assembly includes a pair of brakes 42, 44, each mounted on the body portion 18 for linear sliding movement between braked and unlocked positions. Brakes 42, 44 respectively have elongated slots 46, 48 (see FIG. 5) in which mounting screw posts 50, 52 are stationarily positioned. Springs 54, 56 are mounted in the slots 46, 48 between a respective end of the slots and a respective post.

Brakes 42, 44 respectively have braking end portions 58, 60 (see FIG. 5) and opposite abutment end portions 62, 64. Springs 54, 56 constantly urge the brakes 42, 44 to the braked positions shown in FIG. 1 wherein the braking end portions 58, 60 are urged into locking engagement with the resilient ring 34, and wherein the abutment end portions 62, 64 extend slightly into the channel 20 in the path of insertion of the element 12. Braking end portions 58, 60 are inclined relative to the linear path of movement of the brakes 42, 44. Each brake is operative for preventing turning of the wheel 30 in only one circumferential direction, while allowing turning of the wheel in the opposite circumferential direction about the turn axis 31. The abutment end portions 62, 64 are tapered or rounded to allow the element 12 to readily push the respective brakes 42, 44 to their unlocked positions.

As shown in FIG. 1, prior to insertion of the element 12, the spring 54 tensions the brake 42 to prevent counter-clockwise movement about axis 31, while the spring 56 tensions the brake 44 to prevent clockwise movement. The wheel is locked and cannot be turned in either circumferential direction.

Thereupon, as shown in FIG. 4, the element 12 eventually contacts the abutment end portion 62 and pushes the brake 42 in the direction of arrow B against the force of the spring 54. The braking end portion 58 is disengaged from the wheel, thereby allowing the wheel to be manually turned in the counter-clockwise direction of arrow C. It will be recalled that the inclined braking end portion 60 of the brake 44 does not prevent such counter-clockwise movement.

Upon full insertion of the element 12 in the channel, as shown in FIG. 5, abutment end portion 64 is also contacted by the side edge 12a of the element 12, and the brake 44 is pushed in the direction of the arrow D. The wheel 30 is now fully released and can be manually turned in either circumferential direction indicated by the double-headed arrow E to adjust the position of the element 12 in front of the camera lens 16 in an infinitely variable and continuous manner with a high degree of precision and uniform tactile control.

During turning of the wheel 30, a top edge 12c of the element 12 may be positioned below the brake 42, thereby causing the brake 42 to resume its braking position where it prevents counter-clockwise turning of the wheel. By preventing the wheel from turning counter-clockwise in this situation, the element 12 is prevented from falling out of the lower open end 28 of the channel. Analogously, if, during the turning of the wheel 30, a lower edge 12d of the element 12 is positioned above the brake 44—a situation which is depicted in FIG. 4—then the brake 44 will prevent clockwise turning of the wheel. In this latter situation, the element 12 is prevented from exiting the upper open end 26 of the channel.

Since the brakes 42, 44 effectively prevent the element 12 from being accidentally removed from the channel, a release mechanism is provided when it is desired to deliberately remove the element from the channel, for example, for interchanging one optical element for another in the same holder. To that end, the aforementioned leaf spring 36 offers enough resilience to allow the element to be deliberately and forcibly pulled from the channel, even though the wheel does not turn. In a variant construction, the brakes 42, 44 could be provided with extension handles, thereby allowing the brakes to be manually pulled outward in the directions of arrows B and D to release the brakes when desired.

Figure 6:
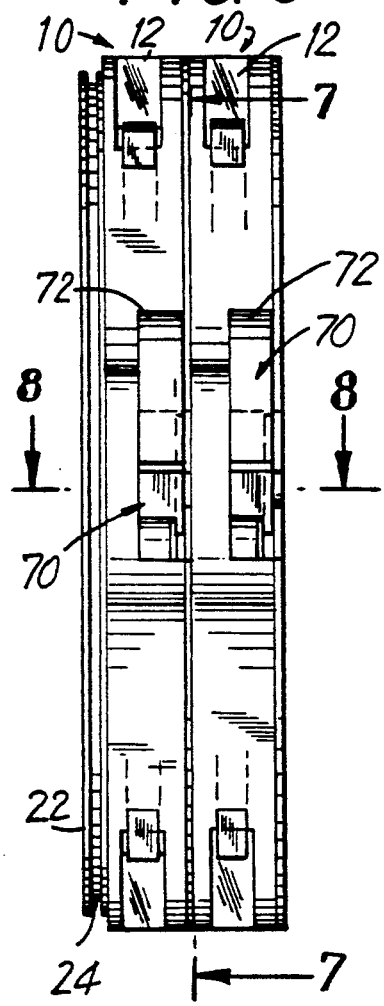
FIG. 6 is a side elevational view of a stack of two accessory holders according to this invention.

Turning next to FIG. 6, two identical holders 10 are shown axially adjacent each other concentric with the optical axis of the camera lens. Each holder 10 holds a respective element 12. A cam locking mechanism 70 is used to rapidly lock and unlock holders relative to each other. As previously mentioned, each holder has an annular portion 22 having an annular groove 24. The annular portion 22 on a first holder at one side thereof is inserted into an opposite side of a second holder. The holders are rotatable relative to each other. The annular portion 22 has holes 80 (see FIG. 1) equiangularly arranged about the optical axis. Set screws are mounted in the holes 80, and extend into the groove 24, but do not touch the base of the groove. This arrangement of set screws prevents two adjacent holders from being pulled axially apart and yet allows free rotation relative to each other.

Figure 7:
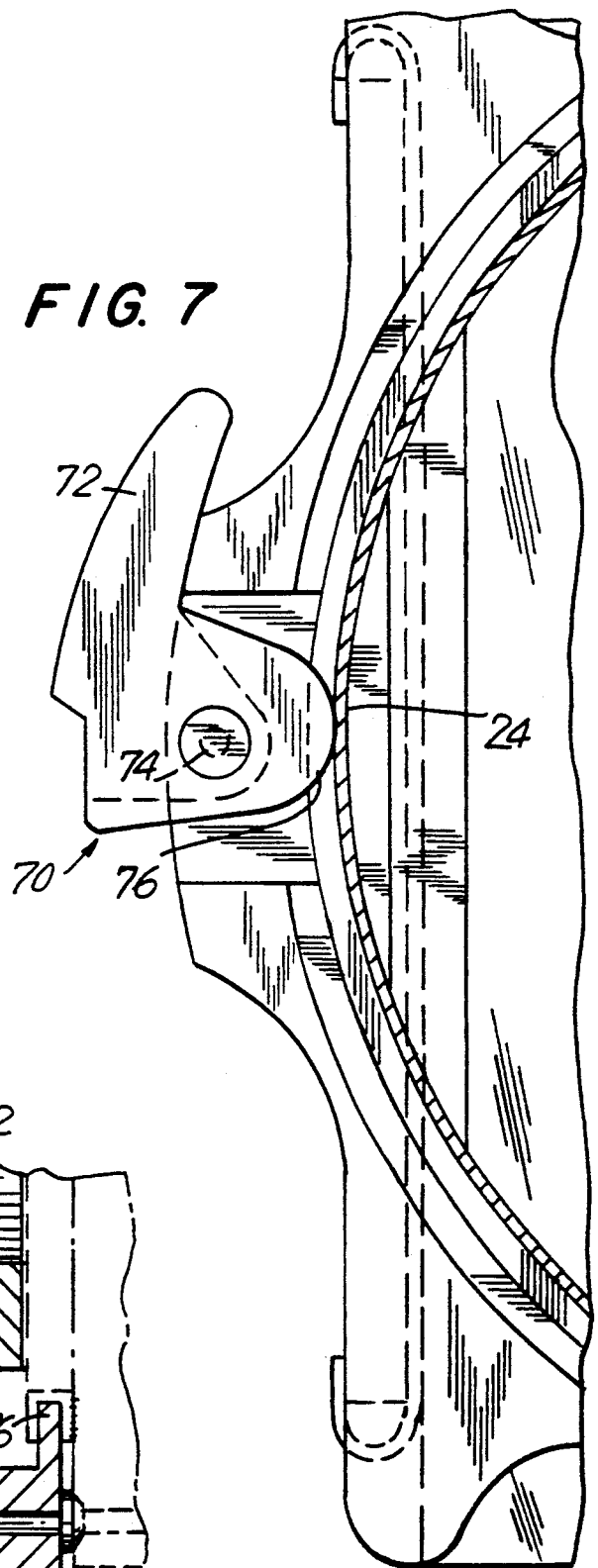
FIG. 7 is an enlarged, partly broken-away, sectional view taken on line 7—7 of FIG. 6.
Figure 8:
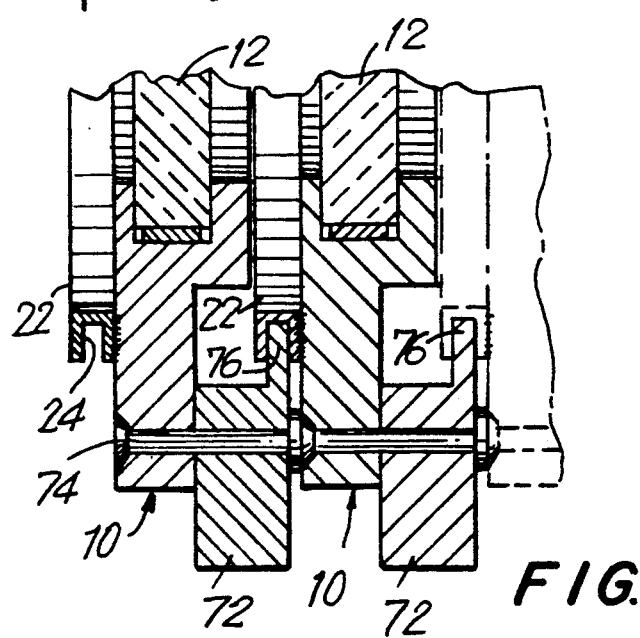
FIG. 8 is an enlarged, partly broken-away, sectional view taken on line 8—8 of FIG. 6.

The mechanism 70 includes a handle 72 (see FIG. 7) mounted on a respective holder 10 for turning movement about a pivot shaft 74. The handle 72 has an eccentric lobe 76 which is moved into (see FIG. 7) and out of (see FIG. 1) camming engagement with the base of the groove 24 upon pivoting of the handle 72. The mechanism 70 functions as a rotational orienting guide. Once a first holder is positioned in a desired angular orientation relative to a second holder, the handle on the first holder is moved inwardly to fix the first holder in position. To re-position the first holder, its handle is moved outwardly. The mechanism 70 on each holder acts instantly, and does not cause undue wear on its associated groove. The mechanism 70 gradually applies pressure in a direction generally tangent to its mating groove. It will be understood by those skilled in the art that many more than the two illustrated holders could be arranged in a row in front of a camera lens to achieve a desired cinematographic effect.

It will be understood that each of the elements described above, or two or more together, also may find a useful application in other types of constructions differing from the type described above.

While the invention has been illustrated and described as embodied in a lens mount accessory system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A lens mount system for mounting optical elements in front of a lens having an optical axis, comprising:
   (a) a holder having a slide channel lying in a plane generally normal to the optical axis, said slide channel having opposite open ends;
   (b) an optical element slidably insertable into the slide channel through one of the open ends thereof along an insertion direction; and
   (c) adjustment means for variably positioning the optical element to a selected position in the slide channel, including a positioning wheel mounted for turning movement on the holder, said positioning wheel resiliently engaging and moving the optical element to the selected position during such turning.

2. The lens mount system according to claim 1, wherein the optical element is a light-transmissive plate having side edges, and wherein the positioning wheel has a resilient outer peripheral portion that resiliently engages one of the side edges of the plate.

3. The lens mount system according to claim 2; and further comprising biasing means on the holder for constantly urging the plate in the slide channel against the positioning wheel.

4. The lens mount system according to claim 3, wherein the biasing means is a spring that engages the other of the side edges of the plate.

5. The lens mount system according to claim 1, wherein the holder has a periphery, and wherein the positioning wheel partly extends past the periphery of the holder to allow a user to have manual access to, and to manually turn, the positioning wheel.

6. The lens mount system according to claim 5; and further comprising finger rests on the holder at opposite sides of the positioning wheel to facilitate manual turning thereof.

7. The lens mount system according to claim 1; and further comprising brake means on the holder for preventing the optical element from accidentally falling out of the channel past either open end thereof.

8. The lens mount system according to claim 7, wherein the brake means includes first and second brakes at opposite sides of the positioning wheel, each brake being movable by the optical element from a braked position in which a respective brake lockingly engages a respective side of the positioning wheel, and an unlocked position in which the respective brake is disengaged from the positioning wheel.

9. The lens mount system according to claim 7; and further comprising release means on the holder for releasing the brake means to enable the optical element to be removed completely from the channel.

10. The lens mount system according to claim 1; and further comprising another holder for holding another optical element, each holder having mating connecting portions rotatable relative to each other about the optical axis; and further comprising a handle-operated camming mechanism on one of the holders for cammingly locking said one holder in a desired angular orientation relative to the other holder.

11. A lens mount system for mounting optical elements in front of a lens having an optical axis, comprising:
(a) a holder having a slide channel lying in a plane generally normal to the optical axis, said channel having opposite open ends;
(b) an optical element slidably insertable into the slide channel through one of the open ends thereof along an insertion direction;
(c) a manually turnable positioning wheel mounted on the holder for turning movement about a turn axis, said wheel extending into the channel for engagement with the optical element to move the same during such turning movement; and
(d) brake means on the holder for preventing the optical element from accidentally falling out of the channel past either open end thereof.

12. The lens mount system according to claim 11, wherein the brake means includes a pair of brakes at opposite sides of the positioning wheel, each brake being movable by the optical element from a braked position in which a respective brake lockingly engages a respective side of the positioning wheel, and an unlocked position in which the respective brake is disengaged from the positioning wheel.

13. The lens mount system according to claim 12, wherein each brake has means for constantly urging the respective brake to the braked position.

14. The lens mount system according to claim 13, wherein each brake has an actuating portion which extends into the channel prior to insertion of the optical element.

15. The lens mount system according to claim 11; and further comprising release means on the holder for releasing the brake means to enable the optical element to be removed completely from the channel.

16. A lens mount system for mounting optical elements in front of a lens having an optical axis, comprising:
(a) a pair of holders, each holding a respective optical element, one of the holders having an annular groove concentric with the optical axis and positioned within the other of the holders; and
(b) quick lock/unlock camming means on the other holder for interlocking the holders together, including a handle operatively connected to, and moving, a cam into and out of camming engagement with the groove at any desired position around the groove.

17. A method of mounting optical elements in front of a lens having an optical axis, comprising the steps of:
(a) slidably inserting an optical element into an open end of a slide channel that lies in a plane generally normal to the optical axis; and
(b) variably positioning the optical element to a selected position in the channel by turning a positioning wheel which resiliently engages and moves the optical element during such turning.

18. The method according to claim 17; and further comprising the step of preventing the optical element from accidentally falling out of the channel.

* * * * *